May 23, 1950 F. LE B. LORD 2,508,409
LOCKING, THREADING ASSEMBLY
Filed March 18, 1948 5 Sheets-Sheet 1
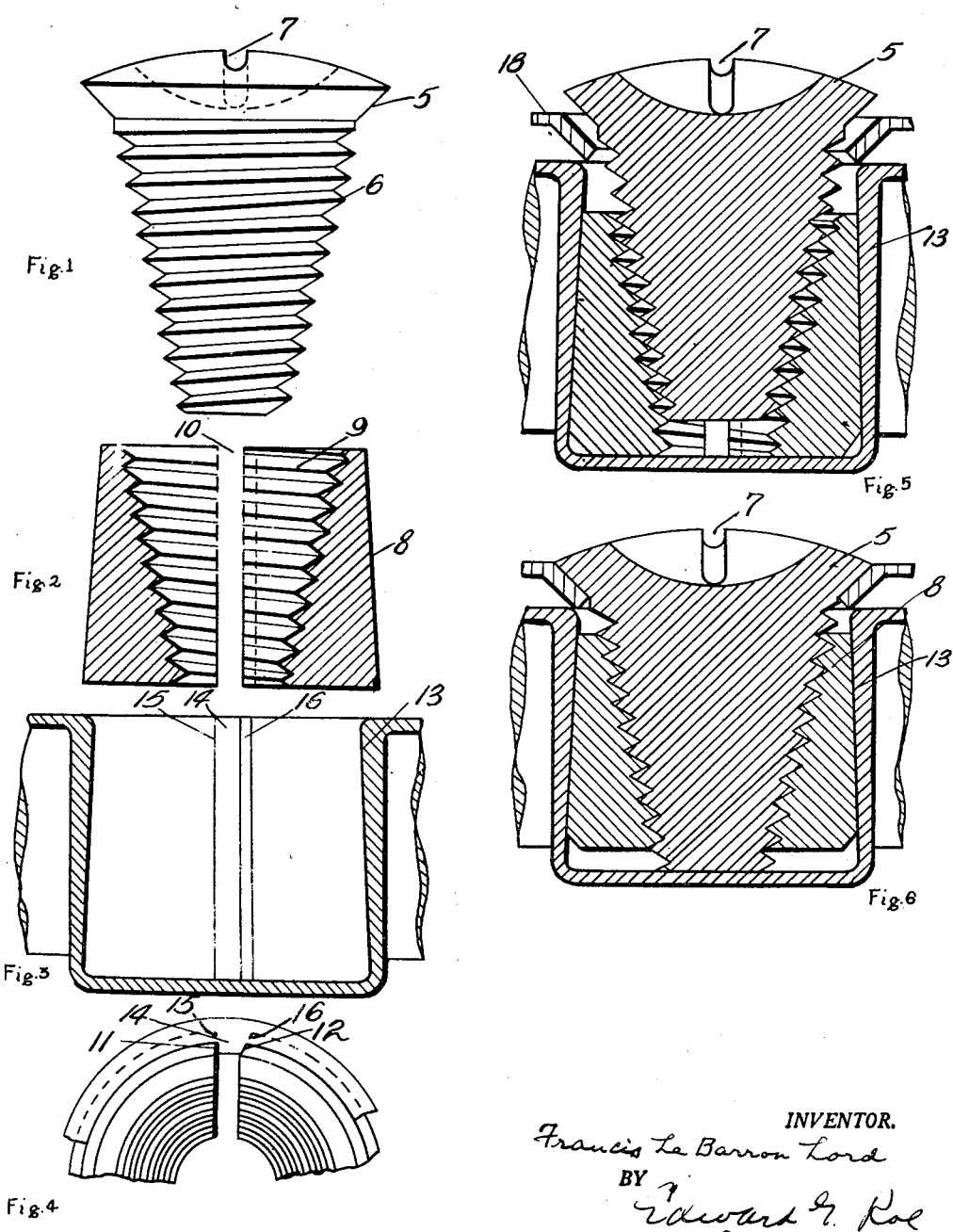
INVENTOR.
Francis LeBarron Lord
BY
Edward G. Koe
Attorney May 23, 1950  F. LE B. LORD  2,508,409
LOCKING, THREADING ASSEMBLY
Filed March 18, 1948  5 Sheets-Sheet 2

INVENTOR.
Francis Le Baron Lord
BY
Edward G. Roe
Attorney

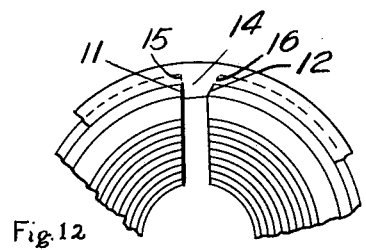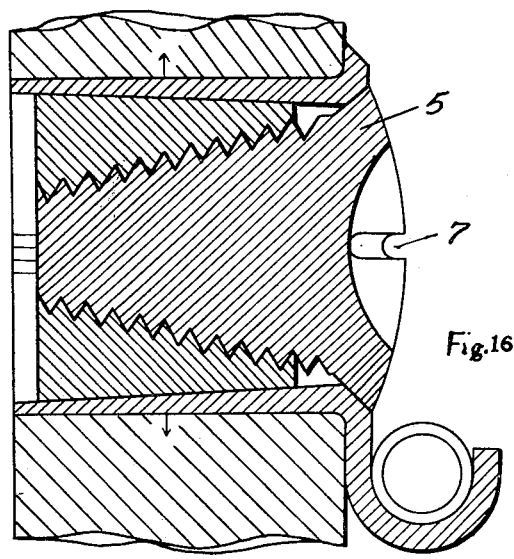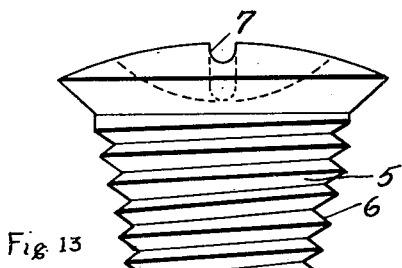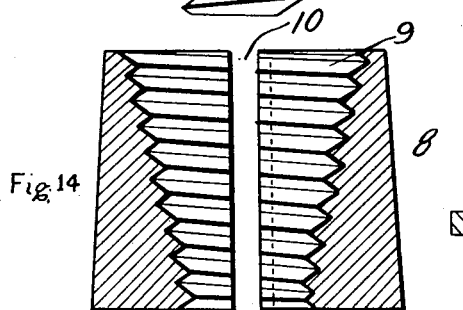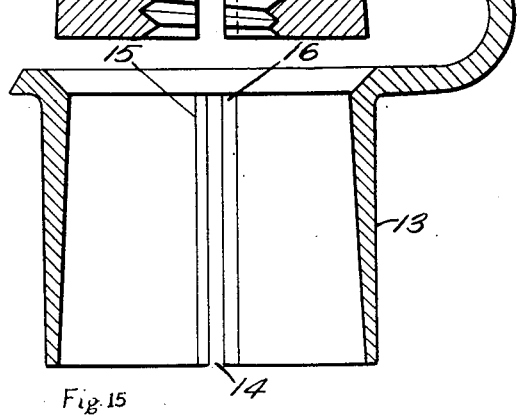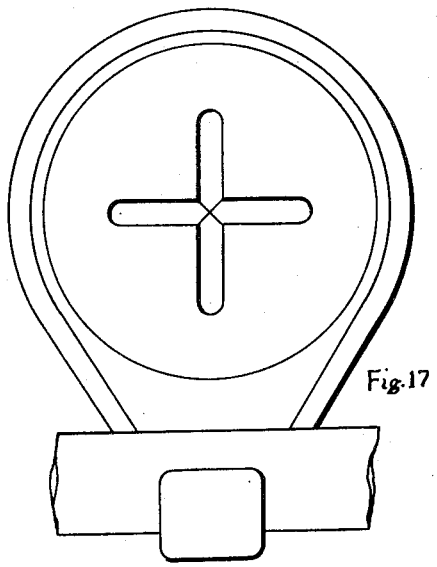

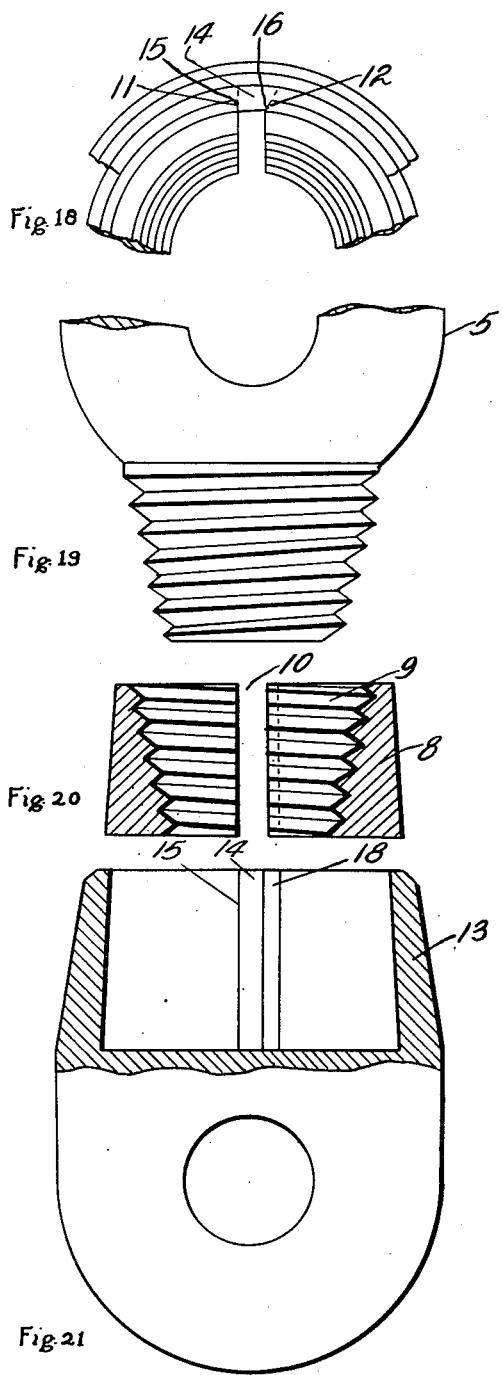
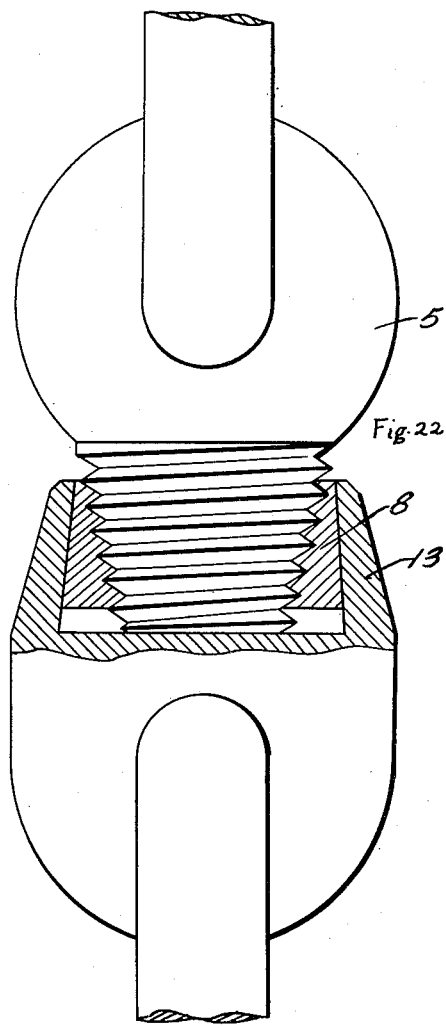

May 23, 1950 F. LE B. LORD 2,508,409
LOCKING, THREADING ASSEMBLY
Filed March 18, 1948 5 Sheets-Sheet 5

INVENTOR.
Francis Le Barron Lord
BY Edward G. Roe
Attorney

Patented May 23, 1950

2,508,409

UNITED STATES PATENT OFFICE 2,508,409

LOCKING, THREADING ASSEMBLY

Francis Le Barron Lord, Bloomfield, N. J., assignor of one-half to Eloise T. Roe, Pleasantville, N. Y.

Application March 18, 1948, Serial No. 15,658

4 Claims. (Cl. 151—19)

This invention relates to locking, threading assemblies.

In the usual form of thread presently employed, the threaded area contacted ranges from 25% to 37%, the strain being on the pull side of the thread in line with the axis of the screw. In the present invention the pull exerted is in line with the axis of the screw and the pressure is transferred to right angles of the axis of the screw thru angular relation of cooperating members of the assembly.

Another object of the invention is to provide a locking threading assembly which may be locked with a minimum of rotation, another object is the provision of an assembly which will tighten when subjected to forces producing vibration instead of loosening, still another is to provide a locking assembly in which a unitary condition is accomplished when the screw is tightened.

The assembly is adapted for employment in various fields where vibration is a factor. Another advantage is that its components may be made of plastics, magnesium, aluminum or other light or heavy metal.

In the drawings:

Fig. 1 is a side elevation of an externally threaded taper screw.

Fig. 2 is a cross-section of the contracter with internally tapered thread to mate the thread of the taper screw shown in Fig. 1.

Fig. 3 illustrates a cross-section of the shell with internally tapered bore to mate the taper of the contracter.

Fig. 4 is a cutaway top of the contracter and shell shown assembled.

Fig. 5—a cutaway view of the contracter and shell with insert in lax position.

Fig. 6 depicts a cutaway view similar to Fig. 5 with the insert fully tightened.

Figs. 7 through 11 show a modified assembly.

Figure 7:
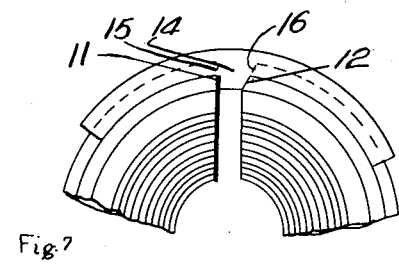
Figure 9:
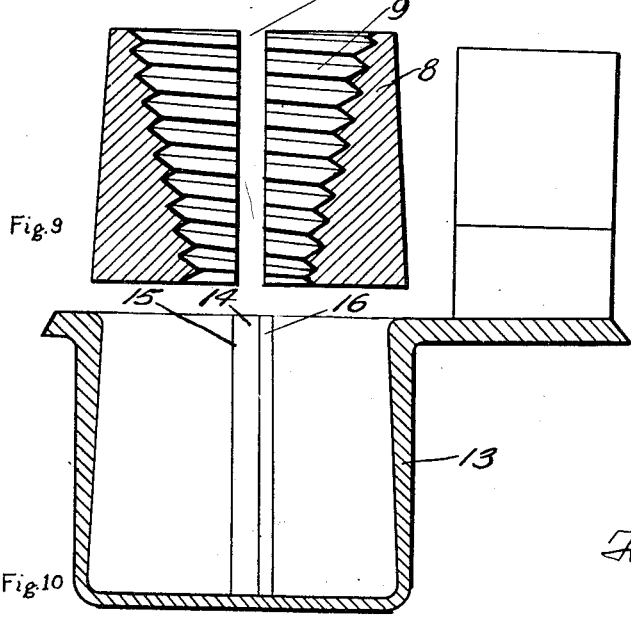
Figure 10:
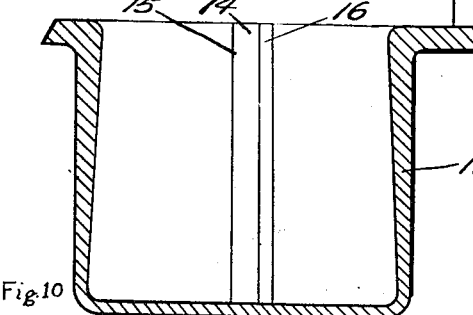

Fig. 7 is a cutaway view taken from the top with contracter and shell shown in Figs. 9 and 10 assembled.

Figure 8:
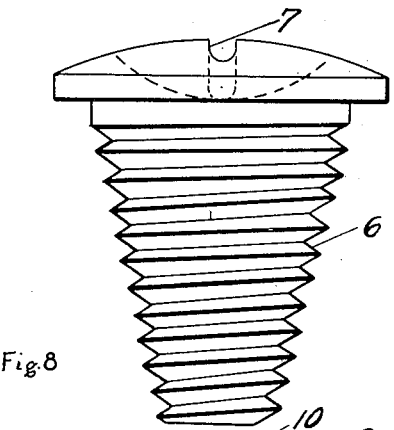

Fig. 8 depicts a screw with externally tapered thread.

Fig. 9—a contracter with internally tapered thread to mate the thread of the screw in Fig. 8.

Fig. 10—a shell internally tapered to mate the external taper of the contracter shown in Fig. 9.

Figure 11:
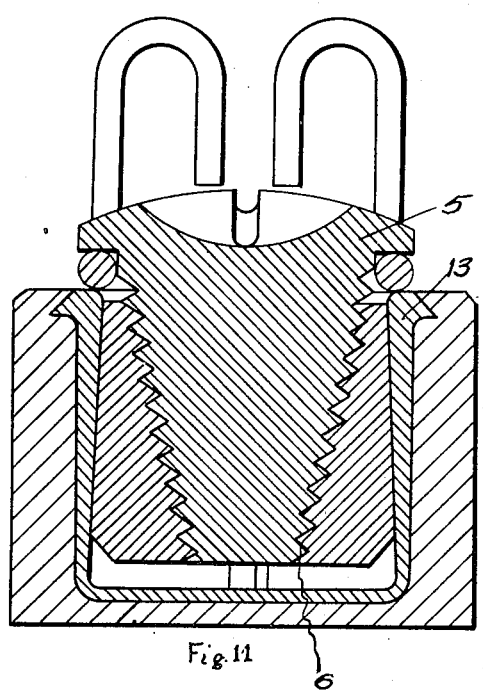

Fig. 11—a modified assembly shown fully tightened.

Figs. 12 through 17 illustrate a modified assembly.

Fig. 12—a cutaway top view of members shown in Figs. 14 and 15 shown assembled without insert.

Fig. 13—a screw with externally tapered thread.

Fig. 14—a contracter with internally tapered thread to mate the thread of the member shown in Fig. 13.

Fig. 15—a shell with internally tapered bore to mate the bore of the contracter shown in Fig. 14.

Fig. 16—a modified assembly shown fully tightened.

Fig. 17—a front view of the modified assembly.

Figs. 18 through 22 show a modified assembly.

Fig. 18—a cutaway top view of the members shown in Figs. 20 and 21 assembled without insert member.

Fig. 19—a cutaway view of the insert member having externally tapered thread.

Fig. 20—a contracter with internally tapered thread to mate the thread of the insert member shown in Fig. 19.

Fig. 21—a cooperating member with internally tapered bore of the contracter shown in Fig. 20.

Fig. 22—a modified assembly shown in locked position.

Figs. 23 through 27 show a modification.

Figure 23:
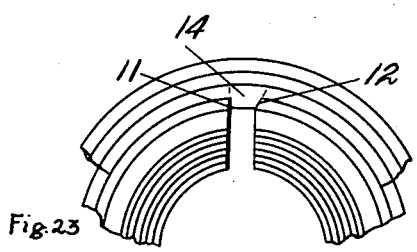
Figure 25:
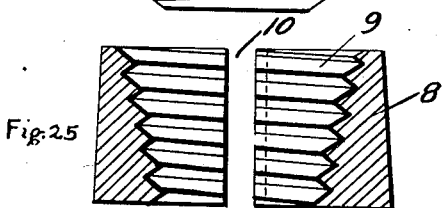
Figure 26:
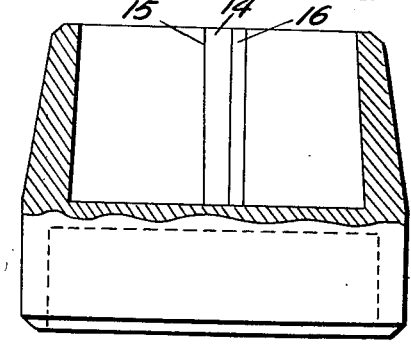

Fig. 23—a top view of the members shown in Figs. 25 and 26 assembled without the insert.

Figure 24:
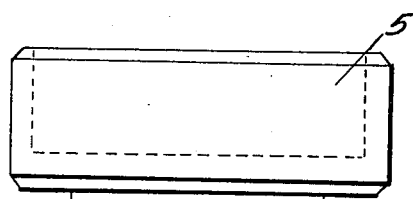

Fig. 24—a modified insert with externally tapered thread.

Fig. 25—a contracter with internally tapered thread to mate the thread of the member.

Fig. 26—a receptor member with internally tapered bore to mate the bore of the contracter shown in Fig. 25.

Figure 27:
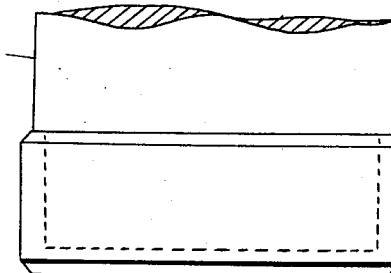

Fig. 27—shows the modification fully tightened

In the drawings Figs. 1 through 6 showing my locking, threading assembly as adapted for use in automobile trim; Figs. 7 through 11 show a modification employed as an electrical connecter; Figs. 12 through 17 a modification for use as a wall bracket; Figs. 18 through 22 a modification which may be employed as a chain coupler; Figs. 23 through 27 a modification used as a battery and electrical cable connecter.

Like reference characters are employed to designate corresponding parts in the following description.

Referring to the drawings, particularly to Figs. 1 through 17, screw or insert 5 is tapered small to bottom, externally taper threaded at 6, with right angle slot for accommodating power or manual screw drivers, said slot preventing slippage of the driver.

Cooperating with insert 5 is contracter 8, internally tapered small to bottom and internally taper threaded as at 9, externally tapered large to bottom, with the internally tapered thread 9 to mate thread 6. Contracter 8 is formed with axial key slot 10 one side of which presents abrupt face 11 and the other beveled face 12.

Shell 13, adapted to receive and hold contracter 8 is internally tapered large to bottom to mate the external taper of member 8.

The shell 13 is provided with axially disposed key 14 extending from the inner wall of the shell and dimensioned to fit key slot 10, as shown in Figs. 4, 7, 12, 18 and 23, and having abrupt face 15 and beveled face 16 cooperating with the corresponding faces of key slot 10.

In manufacturing the assembly shell 13 is cupped up with a straight inside diameter and tapered body large to top on the outside diameter.

To assemble the component members, insert 5 is positioned as shown, for example, in Fig. 5; and but two turns thereof are necessary to cause the assembly to tighten as shown in Figs. 6, 11, 16, 22 and 27. When screw 5 is turned clockwise-positive face 11 of the contracter exerts pressure on abrupt face 15 of the shell member, creating an abrupt condition, causing the contracter to move upwardly on the screw and in the shell and close out all threaded areas.

When subjected to forces producing vibration any tendency of the insert to move in a counter-clockwise direction and to loosen causes face 12 of the key slot to be impressed on face 16 of key 14 creating stoppage seizure of the object screw by contraction of contracter 8 on screw 5.

When insert 5 is turned in a clockwise direction, to tighten the assembly with the pull in line with the axis of the screw, pressure is transferred to right angles of the axis of the screw through angular relation of the members 8 and 13, as the contracter advances on the screw from the lax position to those shown in Figs. 6, 11, 16, 22, and 27, with all threaded areas closed out. The possibility of stripping of threads is positively precluded due to this transference of pressure to right angles of the axis of the screw.

The locking, threading assembly is adaptable for use in any assembly where it is necessary to absolutely preclude vibratory or other unwanted loosening. The drawings disclose several modifications, and the invention is susceptible of employment in many other constructions.

In its broader aspects the invention comprehends the employment not only of the means described, but of equivalent means for performing the recited functions. It is desired to reserve the right to effect such changes as may fairly come within the scope of the appended claims.

I claim:

1. A locking, threading assembly including: an insert tapered small to bottom and externally taper threaded; a contracter externally tapered large to bottom, internally tapered small to bottom, and internally taper threaded to mate the thread of the insert, said contracter provided with an axial key slot having an abrupt and a beveled face; a shell tapered large to bottom to mate the external taper of the contracter holding the contracter therewithin and provided with a key having an abrupt and a beveled face cooperating with the abrupt and beveled faces of the contracter key slot, the abrupt face of the contracter key slot pressing against the abrupt face of the shell key to cause the contracter to move upwardly within the shell and on the insert when the insert is turned clockwise.

2. A locking, threading assembly including: an insert tapered small to bottom and externally taper threaded; a contracter externally tapered large to bottom, internally tapered small to bottom and internally taper threaded to mate the thread of the insert, said contracter provided with an axial key slot having an abrupt and a beveled face; a shell internally tapered large to bottom to mate the external taper of the contracter and holding the contracter therewithin and provided with an axially disposed key extending from the inner wall of the shell and having an abrupt and a beveled face cooperating with the abrupt and beveled faces of the contracter key slot, the abrupt face of the contracter key slot pressing against the abrupt face of the shell key to cause the contracter to move upwardly within the shell and on the insert when the insert is turned clockwise so that threads thereof engage the threads of the contracter whereby with the pull in line with the axis of the insert, pressure is transferred to right angles of the axis thereof through the angular relation of the outside taper of the contracter and the internal taper of the shell.

3. A locking threading assembly, including: an insert tapered small to bottom and externally taper threaded; a contracter externally tapered large to bottom, internally tapered small to bottom and internally taper threaded to mate the thread of the insert, said contracter provided with an axial key slot having an abrupt and a beveled face; a shell internally tapered large to bottom to mate the external taper of the contracter holding the contracter therewithin and provided with a key having an abrupt and a beveled face cooperating with the abrupt and beveled faces of the contracter key slot, the abrupt faces of the contracter key pressing against the abrupt face of the shell key when the insert is turned clockwise, whereby the pull in line with the axis of the insert is transferred to right angles of the said axis to close out all threaded areas as the contracter advances on the insert.

4. A locking, threading assembly including: an insert tapered small to bottom and externally taper threaded; a contracter externally tapered large to bottom, internally tapered small to bottom, and internally taper threaded to mate the thread of the insert, said contracter provided with an axial key slot having an abrupt and a beveled face; a shell tapered large to bottom to mate the external taper of the contracter holding the contracter therewithin and provided with a key having an abrupt and a beveled face cooperating with the abrupt and beveled faces of the contracter key slot, the beveled face of the contracter key slot pressing against the beveled face of the shell key causing a stoppage seizure of the insert by contraction of the contracter when the insert is subjected to forces tending to cause it to move in a counter-clockwise direction.

FRANCIS LE BARRON LORD.

REFERENCES CITED

The following references are of record in the file of this patent:

UNITED STATES PATENTS

| Number | Name | Date |
|---|---|---|
| Re. 20,074 | Stahl | Aug. 18, 1936 |
| 192,636 | Collins | July 3, 1877 |
| 561,758 | Brewer | June 9, 1896 |
| 1,666,375 | Guiducci | Apr. 17, 1928 |
| 1,920,141 | Fischer | July 25, 1933 |